United States Patent
Lin et al.

(10) Patent No.: US 9,256,364 B2
(45) Date of Patent: Feb. 9, 2016

(54) TOUCH CONTROL APPARATUS WHICH IS HELPFUL FOR DOUBLE CLICK DETERMINING, AND COMPUTER READABLE RECORDING MEDIA FOR PERFORMING CORRESPONDING TOUCH CONTROL METHOD

(71) Applicant: PixArt Imaging Inc., Hsin-Chu (TW)

(72) Inventors: Yung-Chang Lin, Hsin-Chu (TW);
Yu-Hao Huang, Hsin-Chu (TW);
Tsung-Fa Wang, Hsin-Chu (TW);
Ching-Lin Chung, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 288 days.

(21) Appl. No.: 13/911,085

(22) Filed: Jun. 6, 2013

(65) Prior Publication Data

US 2014/0240229 A1    Aug. 28, 2014

(30) Foreign Application Priority Data

Feb. 25, 2013   (TW) .............................. 102106549 A (51) Int. Cl.
*G06F 3/041*  (2006.01)
*G06F 3/0488* (2013.01)
*G06F 3/03*   (2006.01)

(52) U.S. Cl.
CPC .......... *G06F 3/04883* (2013.01); *G06F 3/0317* (2013.01)

(58) Field of Classification Search
CPC ...................................................... G06F 3/0418
USPC ........................................... 345/157, 175, 178
See application file for complete search history.

(56) References Cited

U.S. PATENT DOCUMENTS

| | | | |
|---|---|---|---|
| 8,553,000 B2* | 10/2013 | Nakatani ........................ | 345/173 |
| 2011/0043468 A1* | 2/2011 | Lathrop et al. ................. | 345/173 |
| 2012/0026086 A1* | 2/2012 | Liang et al. .................... | 345/157 |
| 2012/0068945 A1* | 3/2012 | Sugeda et al. .................. | 345/173 |
| 2012/0105375 A1* | 5/2012 | Yamada ........................ | 345/175 |
| 2012/0127157 A1* | 5/2012 | Adler et al. .................... | 345/419 |
| 2012/0169604 A1* | 7/2012 | Chen et al. ..................... | 345/168 |
| 2012/0176324 A1* | 7/2012 | Akiyama ....................... | 345/173 |

* cited by examiner

Primary Examiner — Jonathan Blancha
(74) Attorney, Agent, or Firm — Winston Hsu; Scott Margo (57) ABSTRACT

A computer readable recording media comprising at least one program code recorded thereon, a touch control method is performed when the program code is read and executed. The touch control method comprises the following steps: (a) detecting location data for an object relative to a detecting surface to generate at least one displacement data; (b) storing the displacement data to a storage apparatus and outputting the stored displacement data to a target apparatus from the storage apparatus after storing the displacement data for a predetermined time period, when the object touches the detecting surface; and (c) cleaning the stored displacement data when the object leaves the detecting surface.

16 Claims, 8 Drawing Sheets

TOUCH CONTROL APPARATUS WHICH IS HELPFUL FOR DOUBLE CLICK DETERMINING, AND COMPUTER READABLE RECORDING MEDIA FOR PERFORMING CORRESPONDING TOUCH CONTROL METHOD

BACKGROUND OF THE INVENTION

1. Field of the Invention

The present invention relates to a touch control method and a touch control apparatus, and particularly relates to a touch control method and a touch control apparatus which can enhance determination for click operations.

2. Description of the Prior Art

In recent years, various kinds of electronic apparatuses, such as a smart phone or a plat computer always include a touch control apparatus. Touch control apparatuses can be classified into various types. The most popular types of touch control apparatuses are capacitor type and optical type. Theses types of touch control apparatuses both have a detecting surface for an object such as a finger to move thereon.

Figure 1:
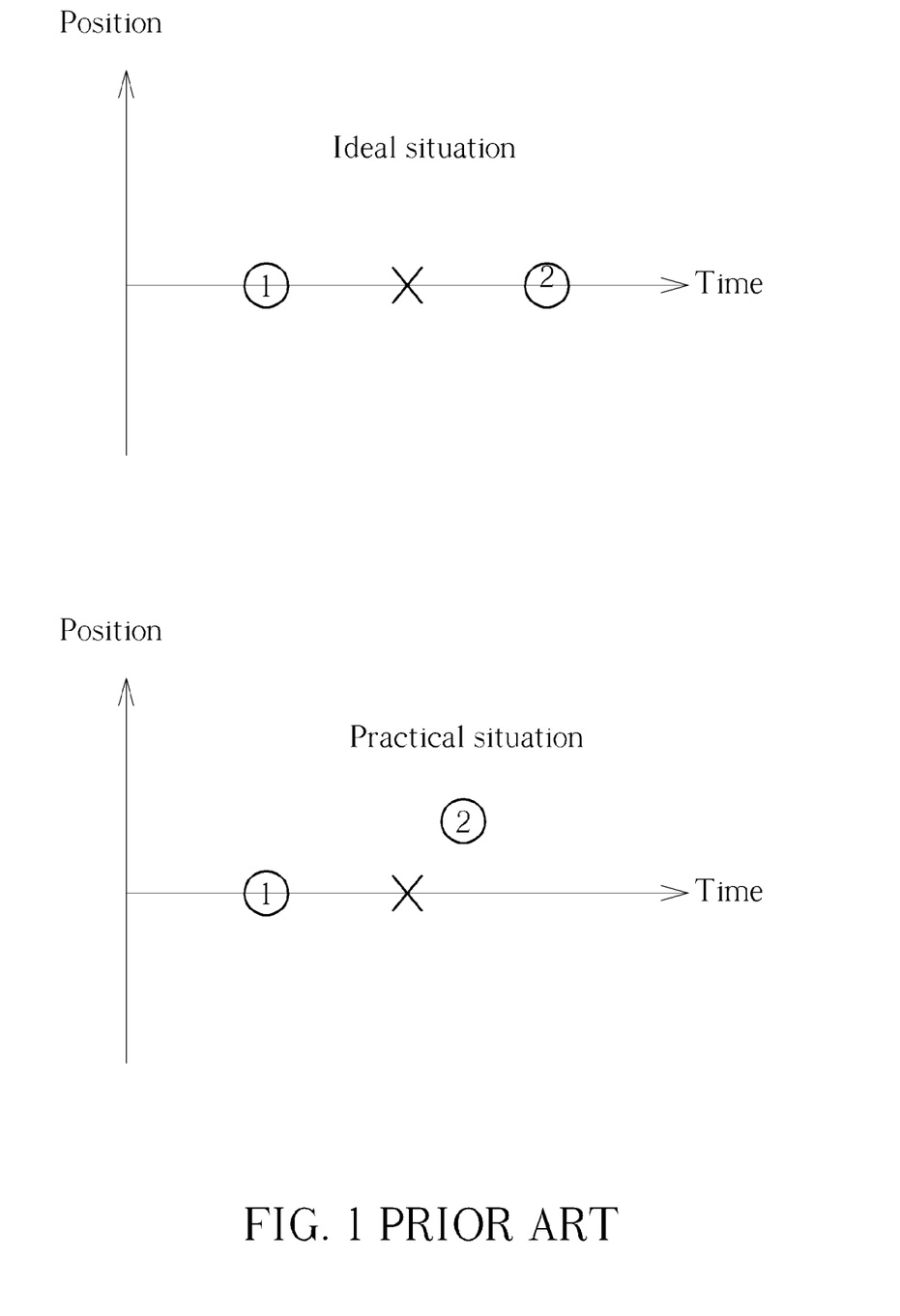
FIG. 1 is a schematic diagram illustrating that a click operation is performed on the touch control apparatus in the prior art.

FIG. 1 is a schematic diagram illustrating that a click operation is performed on the touch control apparatus in the prior art. As shown in FIG. 1, the location 1 indicates the location when the finger leaves the detecting surface, and the symbol X indicates the operation that the finger leaves the detecting surface. Ideally, the location 1 and location 2 are the same, such that the touch control apparatus can determine that the user wants to perform a click operation. Practically, displacement may occur if the finger leaves the detecting surface and puts down again, such that locations 1 and 2 are different. In such situation, the touch control apparatus may wrongly determine that the operation for the location 2 is a simple touch operation rather than a click operation.

Figure 2:
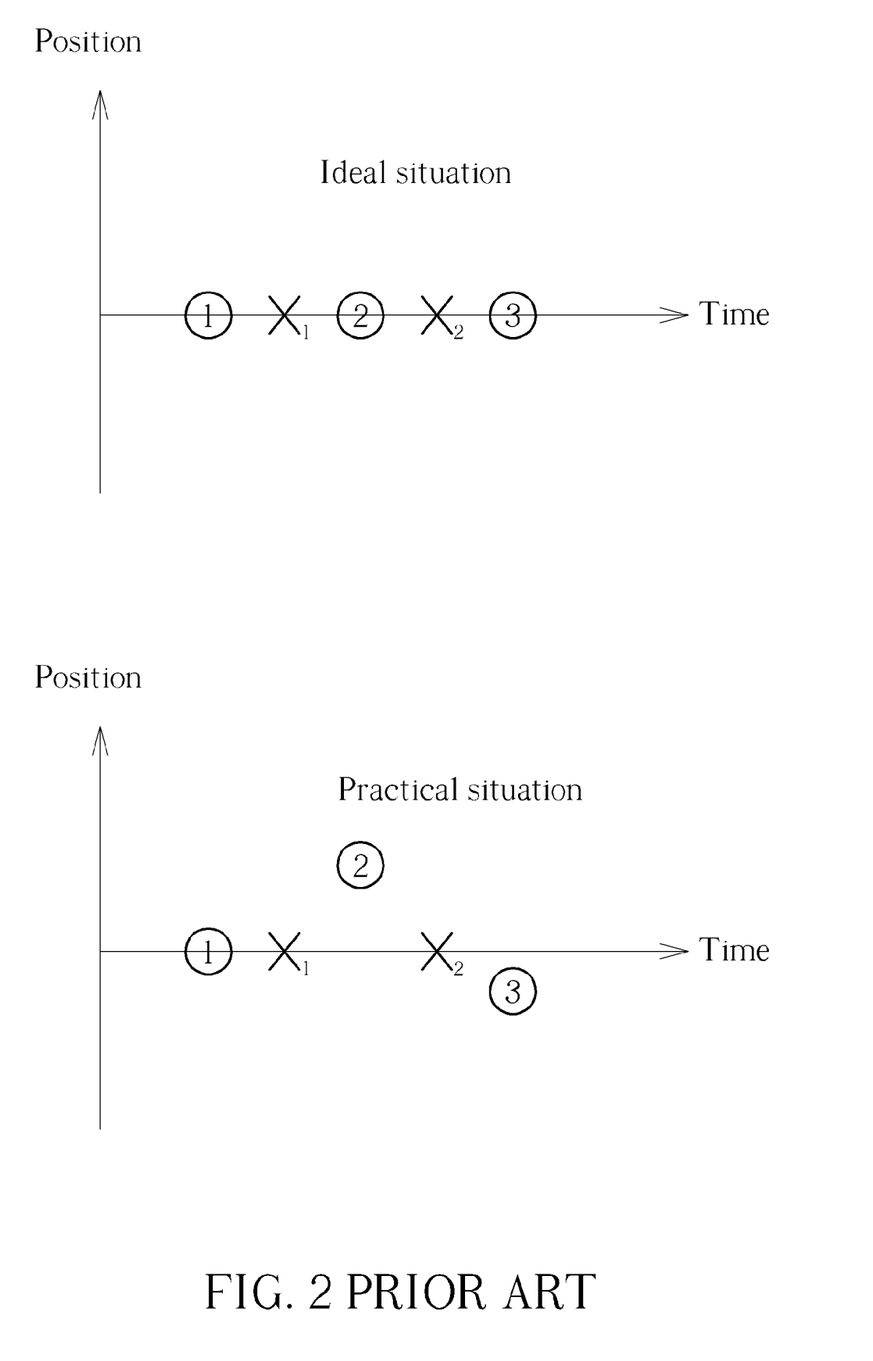
FIG. 2 is a schematic diagram illustrating that a double click operation is performed on the touch control apparatus in the prior art.

The above-mentioned issue is worse when a double click operation is performed. FIG. 2 is a schematic diagram illustrating that a double click operation is performed on the touch control apparatus in the prior art. As shown in FIG. 2, the location 1 indicates the location when the finger leaves the detecting surface for the first time, and the symbol $X_1$ indicates the operation that the finger leaves the detecting surface for the first time. The location 2 indicates the location when the finger leaves the detecting surface for the first time and puts down to perform a click operation, and the symbol $X_2$ indicates the operation that the finger leaves the detecting surface for the second time. The location 3 indicates the location when the finger leaves the detecting surface for the second time and puts down to perform a click operation. Ideally, locations 1, 2 and 3 are at the same locations, such that the touch control apparatus can determine the user want to perform a double click operation. Practically, displacement may occur for each time that the finger leaves the detecting surface and puts down, such that locations 1, 2 and 3 may be different. Therefore, it is more inconvenient for a user to perform a double click operation.

SUMMARY OF THE INVENTION

Therefore, one objective of the present invention is to provide a touch control method and a touch control apparatus, which can enhance determining for a click operation or a double click operation.

One embodiment of the present invention discloses a computer readable recording media comprising at least one program code recorded thereon, a touch control method is performed when the program code is read and executed. The touch control method comprises the following steps: (a) detecting location data for an object relative to a detecting surface to generate at least one displacement data; (b) storing the displacement data to a storage apparatus and outputting the stored displacement data to a target apparatus from the storage apparatus after storing the displacement data for a predetermined time period, when the object touches the detecting surface; and (c) cleaning the stored displacement data when the object leaves the detecting surface.

Another embodiment of the present invention discloses a touch control apparatus, which comprises: a detecting surface, arranged to detect location data for an object to generate at least one displacement data; a storage apparatus; and a control module, arranged to control the storage apparatus to store the displacement data and to output the stored displacement data to a target apparatus from the storage apparatus after store the displacement data for a predetermined time period, when the object touches the detecting surface, wherein the control module further controls the storage apparatus to clean the stored displacement data when the object leaves the detecting surface.

Based upon above-mentioned embodiments, the touch control apparatus computes no displacement due to the user's clicking operation when the user performs a click operation. By this way, the problem of wrongly determining the click operation or the double click operation in the prior art can be avoided.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
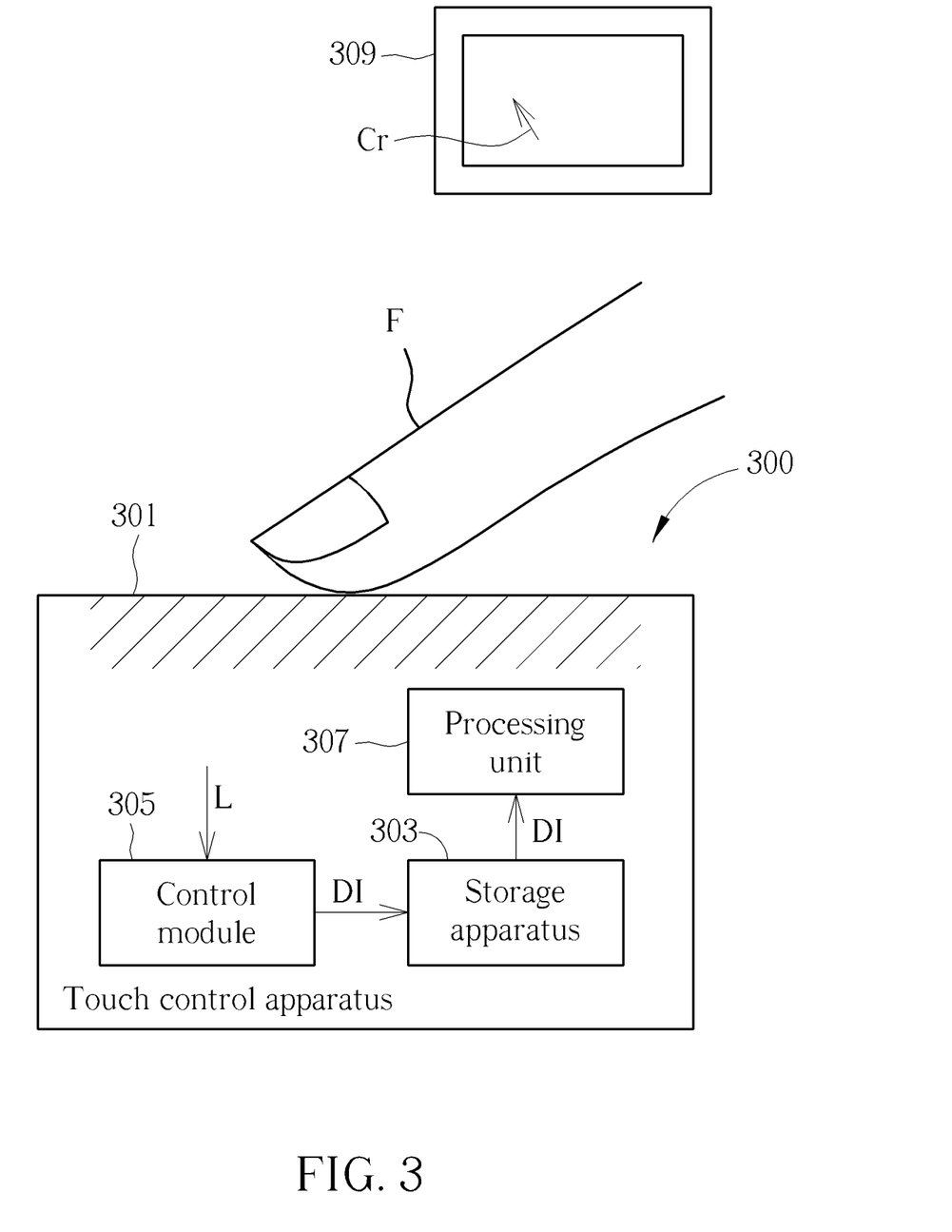
FIG. 3 is a block diagram illustrating a touch control apparatus according to an embodiment of the present invention.

FIG. 3 is a block diagram illustrating a touch control apparatus 300 according to an embodiment of the present invention. As shown in FIG. 3, the touch control apparatus 300 comprises a detecting surface 301, a storage apparatus 303, and a control module 305. The detecting surface 301 detects location data L for an object to generate at least one displacement data DI. The object is a finger F in this example, but also can be other objects. The control module 305 controls the storage apparatus 303 to store the displacement data DI and to output the stored displacement data DI to a target apparatus from the storage apparatus 303 after store the displacement data for a predetermined time period, when the finger F touches the detecting surface 301, no mater the finger F moves or not. Also, the control module 305 further controls the storage apparatus 303 to clean the stored displacement data when the finger F leaves the detecting surface 301. In one embodiment, the touch control apparatus 300 further comprises a processing unit 307, which is arranged to control operations for all devices in the touch control apparatus 300. The above-mentioned target apparatus is the processing unit 307 in this embodiment. The processing unit 307 determines a location of a cursor Cr on a display 309 according to the displacement data when the finger F touches the detecting surface 301. The control module 305 can be integrated to the processing unit 307.

Figure 4A:
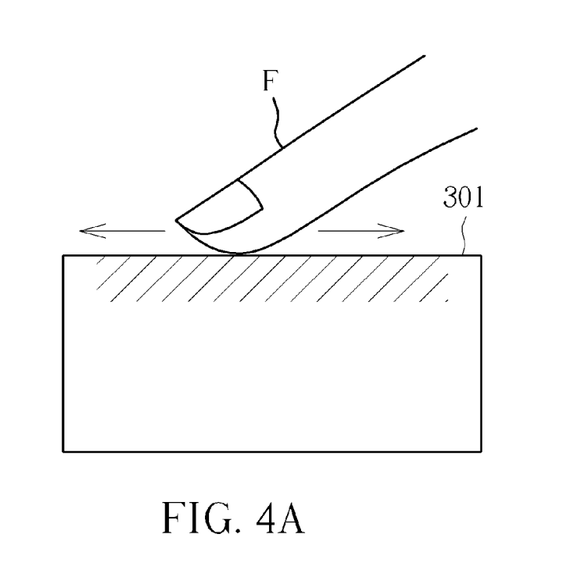
FIG. 4A, FIG. 4B, FIG. 5A, FIG. 5B, FIG. 6A and FIG. 6B are schematic diagrams illustrating the operation for the touch control apparatus according to one embodiment of the present invention.
Figure 4B:
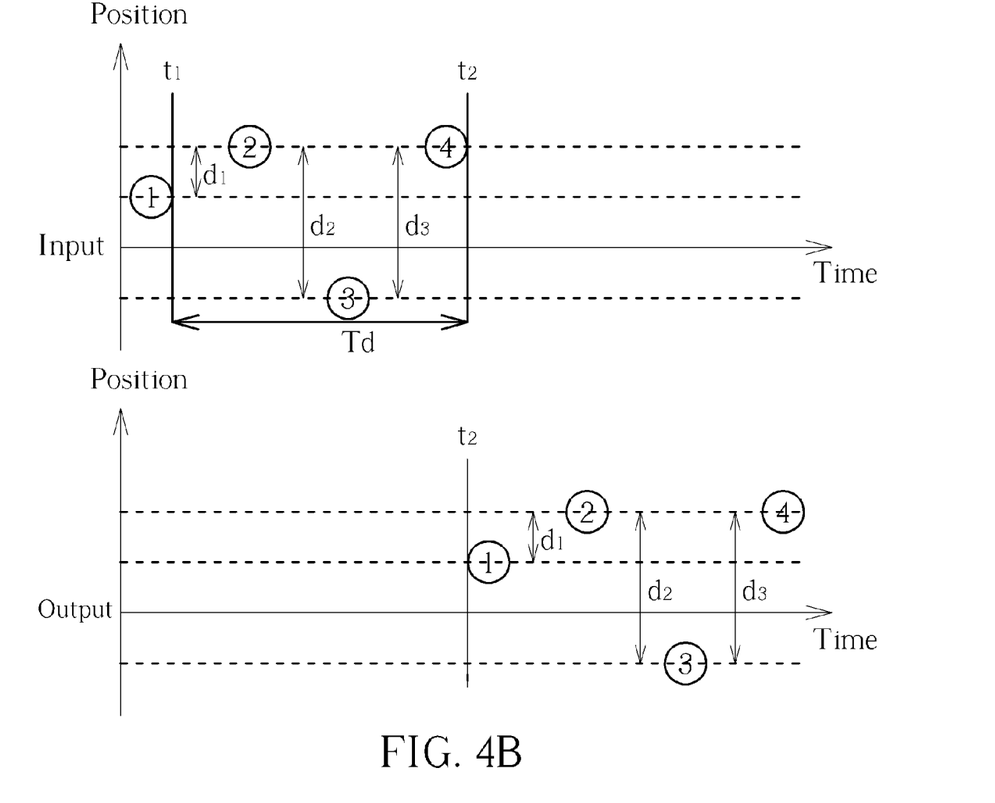

FIG. 4A, FIG. 4B, FIG. 5A, FIG. 5B, FIG. 6A and FIG. 6B are schematic diagrams illustrating the operation for the touch control apparatus according to one embodiment of the present invention. Please note some devices in the touch control apparatus are not illustrated in FIG. 4A, FIG. 4B, FIG. 5A, FIG. 5B, FIG. 6A and FIG. 6B for brevity. FIG. 4A and FIG. 4B illustrate how the finger F moves on the detecting surface 301. As shown in FIG. 4B, the locations for the finger F are sequentially 1, 2, 3 and 4, such that displacement data d1, d2 and d3 are generated. The control module 305 controls the displacement data d1, d2 and d3 to be stored for a predetermined time period Td before being output. That is, the performance for the movement of the finger F is delayed by the touch control apparatus for the predetermined time period Td after the touch control apparatus receives the movement. Therefore if touch control apparatus controls the cursor on the display and the user moves his finger on the touch control apparatus, the cursor moves after predetermined time period Td has passed. The user will feel non-obvious delay if the predetermined time period Td is small enough, however.

Figure 5A:
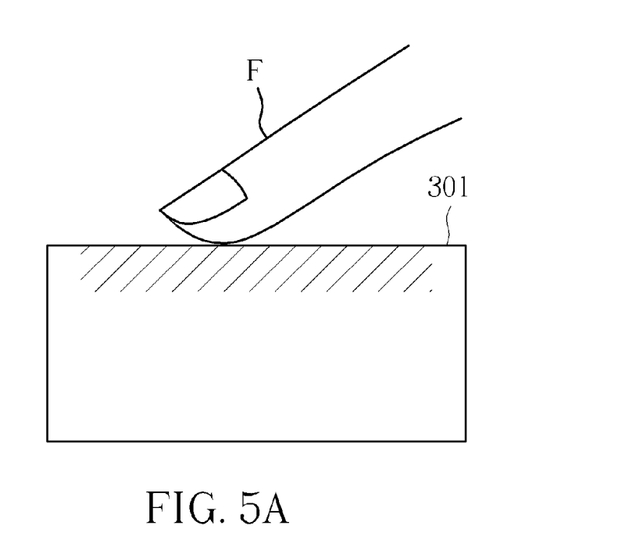
Figure 5B:
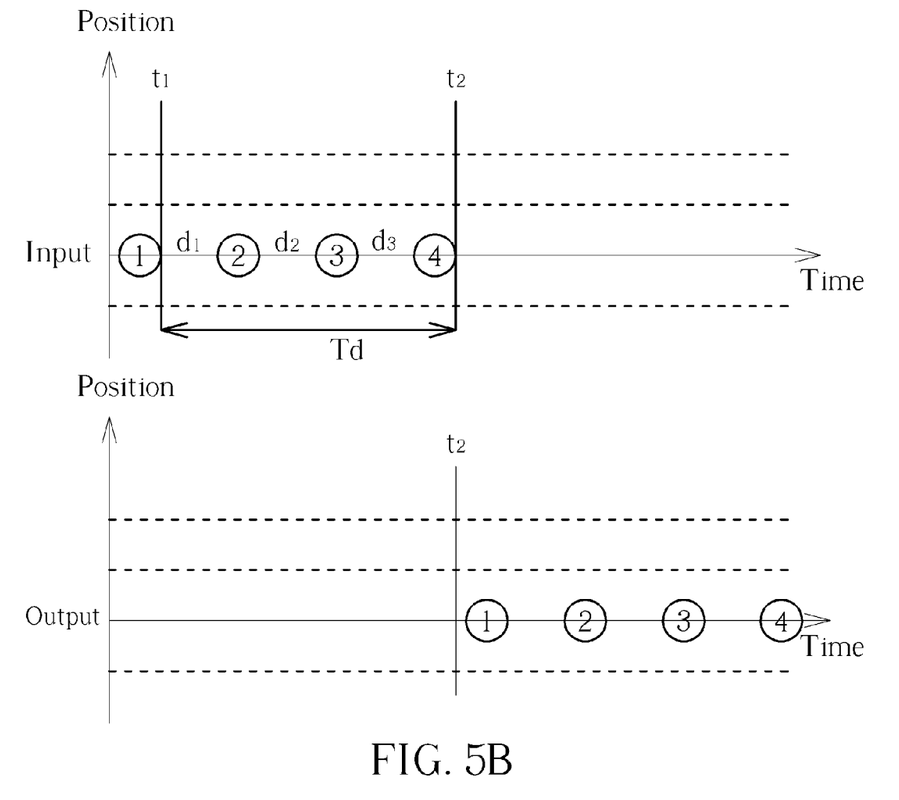

FIG. 5A and FIG. 5B illustrate the finger F touches the detecting surface 301 but does not move. As shown in FIG. 5B, the locations for the finger F are sequentially 1, 2, 3 and 4, which are the same, such that displacement data d1, d2 and d3 having values 0 are generated. The displacement data d1, d2 and d3 are also stored for a predetermined time period Td before being output. The user senses no movement since the displacement data d1, d2 and d3 are 0.

Figure 6A:
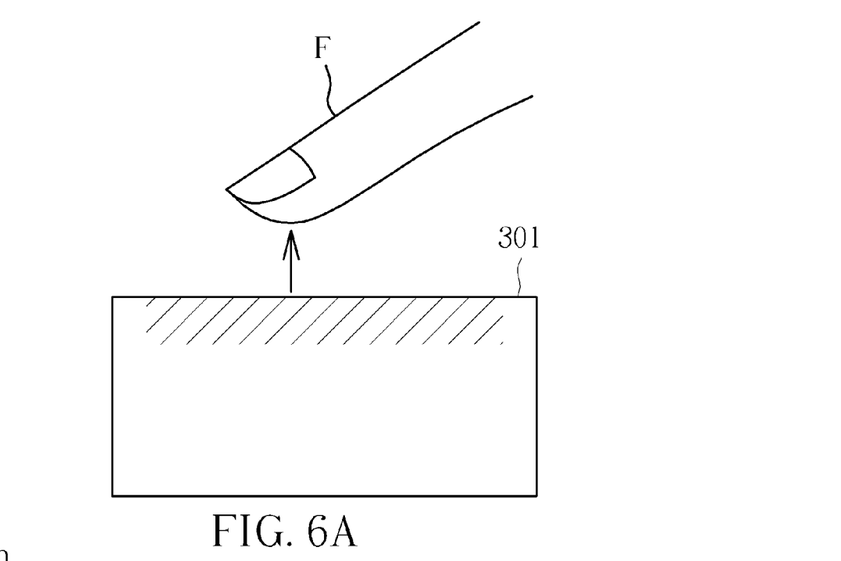
Figure 6B:
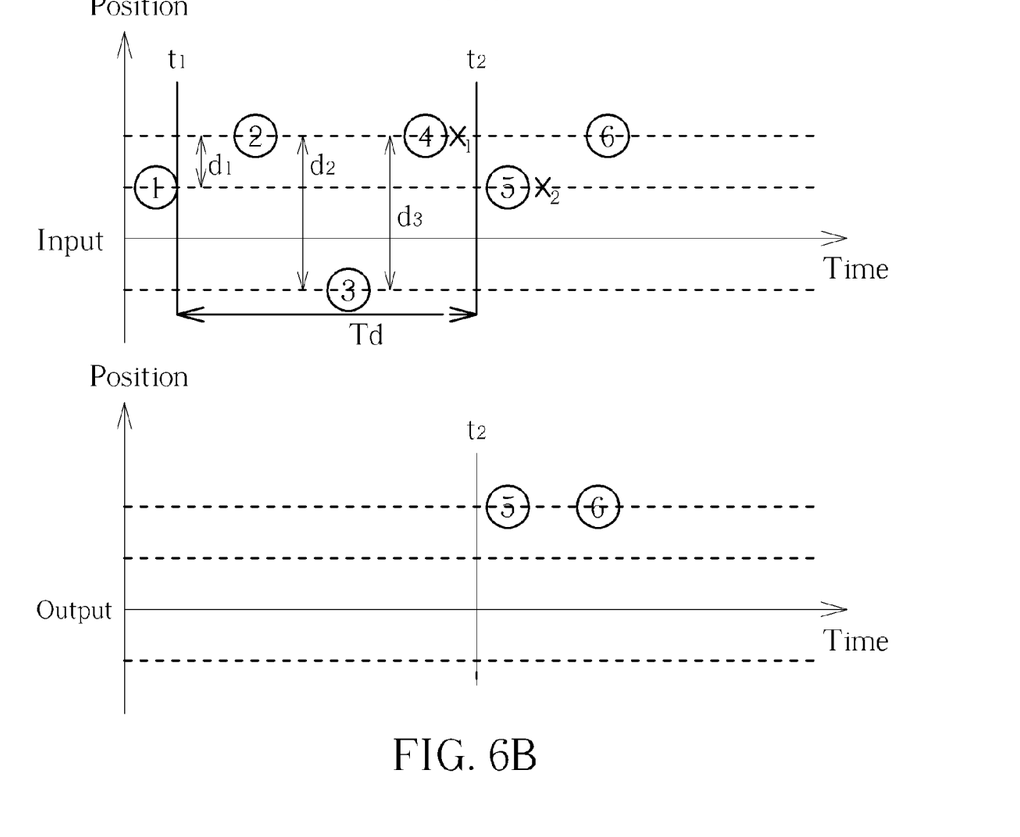

FIG. 6A and FIG. 6B illustrate the finger F performs a click operation. As shown in FIG. 6B, the finger F performs a click operation after moving for a short distance that generates displacement data d1, d2, and d3. Such click operation includes an operation that the finger F leaves the detecting surface 301 (the symbol X) and the finger F goes back to the detecting surface 301 (the location 5). The storing time period for the displacement data d1, d2 and d3 is less than the predetermined time period Td when the finger F leaves the detecting surface 301, thus the displacement data d1, d2 and d3 are not output. In such situation, the displacement data d1, d2 and d3 are cleaned. The touch control will not determine displacement occurs since no displacement data is received when the finger puts down to the location 5, thus the finger F is determined to continuously put down to the same location and to be regarded as a click operation. Please go back to FIG. 6B again, if the user performs a double click operation, the finger F has operations comprising first leaving→first touch→second leaving→second touch, such as the $X_1$→location 5→$X_2$→location 6 shown in FIG. 6B. Following above-mentioned concept, the displacement data are cleaned when the finger leaves for the first time and for the second time, thus locations 5 and 6 are determined to have no displacement and regarded as the same locations. By this way, a double click operation is performed.

The above-mentioned predetermined time period Td can be set to any value. For example, different users may have different user behaviors. Some users concerns sensitivity for movement more than the convenience for performing a click operation or a double click operation, thus the predetermined time period Td can be set to have a smaller value for these users. On the contrary, some users concerns the convenience for performing a click operation or a double click operation more than the sensitivity for movement, thus the predetermined time period Td can be set to have a larger value for these users. In one embodiment, the predetermined time period Td is a time period for generating N displacement data, where N is a positive integer. For example, if time for generating a displacement data is 8 ms (i.e. Td is 8 Nms) and N is 3, the Td is 24 ms in this case.

The touch control apparatus can further comprise an activating mechanism for determining whether the touch control method in the above-mentioned embodiment is used or a prior art touch control method without no click operation is used (i.e. output the displacement data immediately). Such activating mechanism can be activated by a hardware switch (ex. a switch on the touch control apparatus), or set by software (ex. set the touch control apparatus via a computer). In one embodiment, at least one displacement in a time period is determined to check if it is larger than a threshold value. It is determined that the user is performing a moving operation or tries to perform a moving operation if the displacement is larger than the threshold value, thus the touch control operation disclosed by the present invention is not performed. It is determined that the user wants to perform a click operation if the displacement is smaller than the threshold value, thus the touch control operation disclosed by the present invention is performed. For more detail, if the displacement data is larger than the threshold value, the displacement data is not stored as above-mentioned and is outputted to the target apparatus immediately, and is not cleaned even the finger F leaves the detecting surface. Alternatively, the displacement data can still be stored and be outputted after being stored for a predetermined time period, but not cleaned even the finger F leaves the detecting surface. Via such mechanism, the displacement can be prevented from losing due to unintentional leaving of the finger F when the finger F moves quickly on the detecting surface.

Figure 7A:
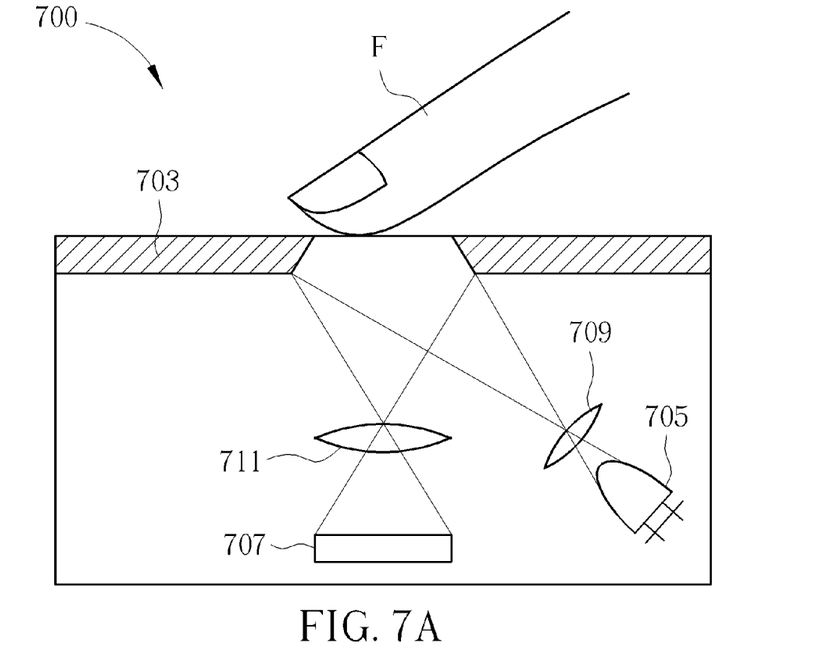
FIG. 7A and FIG. 7B are schematic diagrams illustrating an optical touch control apparatus according to one embodiment of the present invention.
Figure 7B:
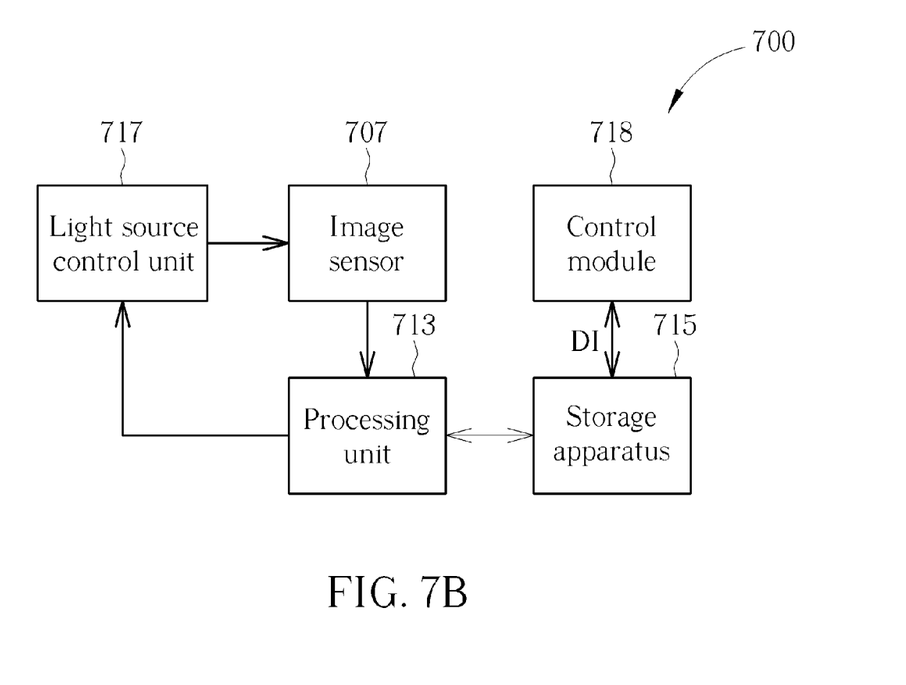

The touch control method provided by the present invention can be applied to various kinds of touch control apparatuses, for example, an optical touch control apparatus (but not limited). FIG. 7A and FIG. 7B are schematic diagrams illustrating an optical touch control apparatus 700 according to one embodiment of the present invention, which performs touch control operation via an object (ex. finger F). FIG. 7A is a cross-sectional view for an optical touch control apparatus 700, and FIG. 7B discloses a circuit block diagram, which is inside the optical touch control apparatus 700, for controlling the operation of the optical touch control apparatus 700. Please refer both FIG. 7A and FIG. 7B to under stand the present invention for more clarity. The optical touch control apparatus 700 comprises a detecting surface 703, a light source 705, an image sensor 707, lens 709, 711, a processing unit 713, a storage apparatus 715, a light source control unit 717 and a control module 718. The light source 705 is controlled by the light source control unit 717 to emit light to the finger F on the detecting surface 703 to generate at least one image. The image sensor 707 derives the frames in the image. The processing unit 713 computes location and displacement of the finger F according to the frames, thereby the finger F can perform a touch control operation. Additionally, the processing unit 713 also controls data accessing of the storage apparatus 715 and operation of the light source control unit 717. The operations of the processing unit 713, the storage apparatus 715 and the control module 718 are the same as which of the processing unit 307, the storage apparatus 303 and the control module 305, thus it is omitted for brevity here. In this embodiment, the displacement data can be generated via the control module 718 or the image sensor 707. Also, the image sensor can be integrated to the processing unit 713 or the image sensor 707.

Figure 8:
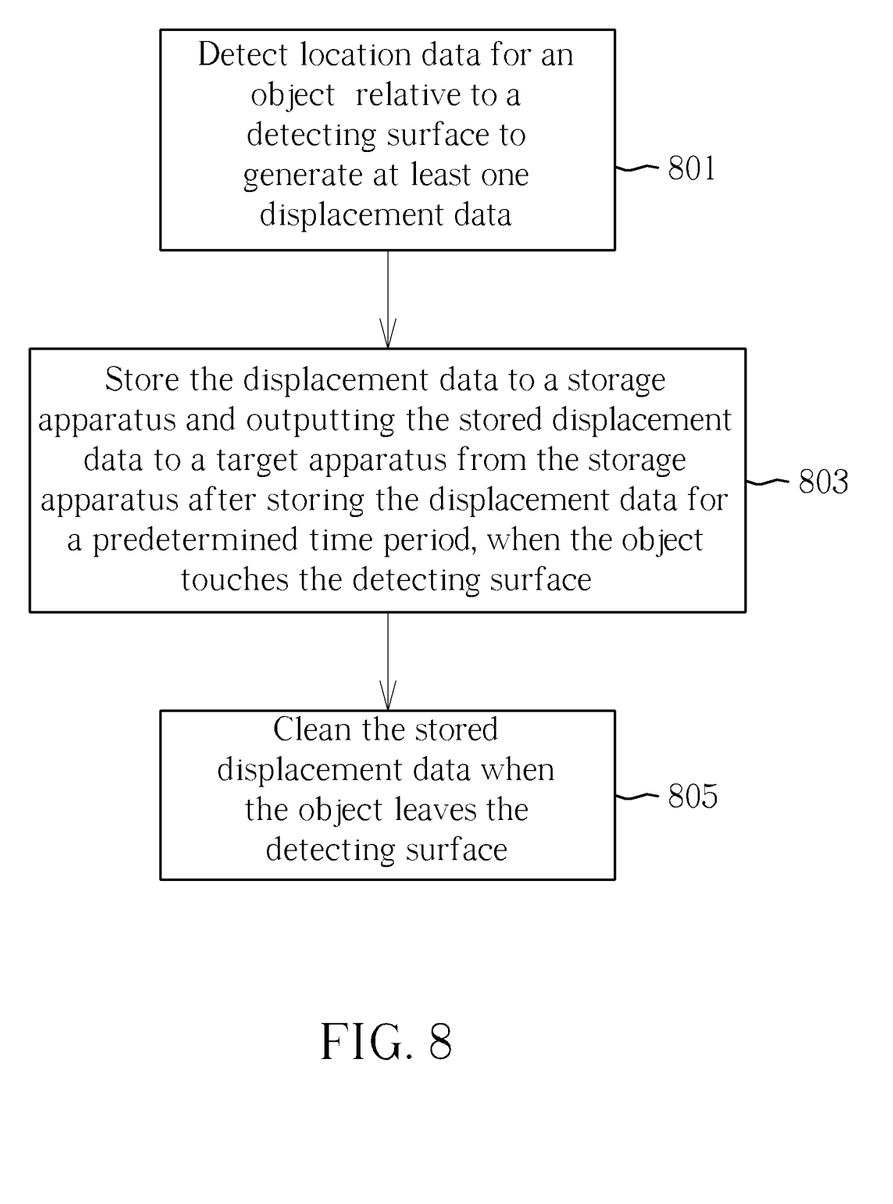
FIG. 8 is a schematic diagram illustrating steps for a touch control method according to the embodiment of the present invention.

In view of above-mentioned embodiments, a touch control method can be acquires, as shown in FIG. 8:

Step 801

Detect location data for an object (ex. finger F) relative to a detecting surface to generate at least one displacement data (ex. displacement data d1, d2, d3 in FIG. 4B).

Step 803

Store the displacement data to a storage apparatus and outputting the stored displacement data to a target apparatus from the storage apparatus after storing the displacement data for a predetermined time period (such as the embodiments shown in FIG. 4A, FIG. 4B, FIG. 5A and FIG. 5B), when the object touches the detecting surface (the object can move or stop).

Step 805

Clean the stored displacement data when the object leaves the detecting surface (ex. embodiments shown in FIG. 6A, and FIG. 6B).

The above-mentioned steps can be performed via program codes recorded in a computer readable recording media (but not limited). Other characteristics are described in above-mentioned embodiments, thus are omitted for brevity here.

Based upon above-mentioned embodiments, the touch control apparatus computes no displacement due to the user's clicking operation when the user performs a click operation. By this way, the problem of wrongly determining the click operation or the double click operation in the prior art can be avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A non-transitory computer readable recording media, comprising at least one program code recorded thereon, a touch control method is performed when the program code is read and executed, wherein the touch control method comprises the following steps:
   (a) detecting location data for an object relative to a detecting surface to generate at least one displacement data;
   (b) storing the displacement data to a storage apparatus and outputting the stored displacement data to a target apparatus from the storage apparatus after storing the displacement data for a predetermined time period, when the object touches the detecting surface; and
   (c) cleaning the stored displacement data when the object leaves the detecting surface.

2. The non-transitory computer readable recording media of claim 1, wherein the target apparatus is a processing unit, where the step (b) further comprises:
   utilizing the processing unit to determine a location of an cursor according to the displacement data output from the storage apparatus.

3. The non-transitory computer readable recording media of claim 1, wherein the touch control method further comprises:
   if the displacement for the object relative to the detecting surface is larger than a threshold value, storing none of the displacement data corresponding to the displacement and transmitting the displacement data to the target apparatus immediately, or cleaning none of the displacement when the object leaves the detecting surface.

4. The non-transitory computer readable recording media of claim 1, wherein the touch control method further comprises:
   cleaning the stored displacement data after the displacement data has been transmitted to the target apparatus.

5. The non-transitory computer readable recording media of claim 1, wherein the predetermined time period is a time period for generating N displacement data, where N is a positive integer.

6. The non-transitory computer readable recording media of claim 1, wherein the predetermined time period is 24 ms.

7. The non-transitory computer readable recording media of claim 1, wherein an amount of the stored displacement data outputted to the target apparatus is less than an amount of the displacement data still stored in the storage apparatus.

8. A touch control apparatus, comprising:
   a detecting surface, arranged to detect location data for an object to generate at least one displacement data;
   a storage apparatus; and
   a control module, arranged to control the storage apparatus to store the displacement data and to output the stored displacement data to a target apparatus from the storage apparatus after store the displacement data for a predetermined time period, when the object touches the detecting surface, wherein the control module further controls the storage apparatus to clean the stored displacement data when the object leaves the detecting surface.

9. The touch control apparatus of claim 8, wherein the touch control apparatus is an optical touch control apparatus comprising:
   a light source, arranged to emit light to the object on the detecting surface to generate at least one object image;
   an image sensor, for generating the displacement data according to the object image, wherein the control module is integrated to the image sensor.

10. The touch control apparatus of claim 8, further comprising a processing unit arranged to determine a location of an cursor on a display according to the displacement data when the object touches the detecting surface, wherein the target apparatus is the processing unit.

11. The touch control apparatus of claim 8, wherein the control module is integrated to the processing unit.

12. The touch control apparatus of claim 8, wherein if the control module determines that the displacement for the object relative to the detecting surface is larger than a threshold value, the control module controls the storage apparatus to store none of the displacement data corresponding to the displacement and controls the displacement data to be transmitted to the target apparatus immediately, or the control module cleans none of the displacement when the object leaves the detecting surface.

13. The touch control apparatus of claim 8, wherein the control module cleans the stored displacement data after the control module controls the displacement data to be transmitted to the target apparatus.

14. The touch control apparatus of claim 8, wherein the predetermined time period is 24 ms.

15. The touch control apparatus of claim 8, wherein the predetermined time period is a time period for generating N displacement data, where N is a positive integer.

16. The touch control apparatus of claim 8, wherein an amount of the stored displacement data outputted to the target apparatus is less than an amount of the displacement data still stored in the storage apparatus.

\* \* \* \* \*